US012741433B2

(12) United States Patent
Dollinger et al.

(10) Patent No.: US 12,741,433 B2
(45) Date of Patent: Sep. 22, 2026

(54) METHOD FOR MARKING A VEHICLE TIRE, AND MARKING STATION

(71) Applicant: ZF Friedrichshafen AG, Friedrichshafen (DE)

(72) Inventors: Thomas Dollinger, Passau (DE); Andreas Griebl, Haarbach (DE); Florian Stemplinger, Wegscheid (DE); Johannes Maier, Künzing (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 18/249,105

(22) PCT Filed: Oct. 12, 2021

(86) PCT No.: PCT/EP2021/078104
§ 371 (c)(1),
(2) Date: Apr. 14, 2023

(87) PCT Pub. No.: WO2022/078981
PCT Pub. Date: Apr. 21, 2022

(65) Prior Publication Data

US 2023/0391032 A1 Dec. 7, 2023

(30) Foreign Application Priority Data

Oct. 16, 2020 (DE) .................... 10 2020 213 073.6

(51) Int. Cl.
*B29D 30/00* (2006.01)
*G01M 1/26* (2006.01)
*G01M 17/02* (2006.01)

(52) U.S. Cl.
CPC ..... *B29D 30/0061* (2013.01); *B29D 30/0016* (2013.01); *B29D 30/005* (2013.01);
(Continued)

(58) Field of Classification Search
CPC .......... B29D 2030/728; B60C 13/001; G01M 17/024; B41J 3/4073; F16C 2322/59;
(Continued)

(56) References Cited

U.S. PATENT DOCUMENTS 6,510,996 B1 1/2003 Lee et al.
7,772,521 B2 8/2010 Smith, Jr. et al.
(Continued)

FOREIGN PATENT DOCUMENTS

DE 10 2015 216 524 A1 3/2017
DE 10 2017 205 413 A1 10/2018
(Continued)

OTHER PUBLICATIONS

Espacenet translation of Miyazaki et al., JP 2002122500 A, originally published 2002 (Year: 2002).*
(Continued)

*Primary Examiner* — Larry W Thrower
*Assistant Examiner* — Jennifer L Groux
(74) *Attorney, Agent, or Firm* — Secant IP, PLLC

(57) ABSTRACT

The invention relates to a method for marking a vehicle tyre (20) and a corresponding marking station. In one example, the vehicle tyre is supplied (100) to a marking station (10), the vehicle tyre (20) is aligned and centred (102, 103) in the marking station (10), marking is performed (108) in the marking station in accordance with characteristics of the vehicle tyre (20), and marking is performed (108) using one marking device (12) from a multiplicity of different marking devices (12). The method according to the invention is distinguished by the fact that the marking device (12) for marking the vehicle tyre (20) is positioned (107) at the vehicle tyre (20) by means of a robot arm (11).

8 Claims, 2 Drawing Sheets

(52) U.S. Cl.
CPC ............ *G01M 1/26* (2013.01); *G01M 17/024* (2013.01); *B29D 2030/0027* (2013.01)

(58) Field of Classification Search
CPC ...... B25J 15/0009; B25J 15/10; B25J 15/103; B25J 15/106; B25J 11/005; B25J 11/0075; B25J 15/0491; B25J 15/0433
See application file for complete search history.

(56) References Cited

U.S. PATENT DOCUMENTS

| | | | | |
|---|---|---|---|---|
| 9,310,270 | B2 | 4/2016 | Lawson et al. | |
| 10,654,323 | B2 | 5/2020 | Azzari et al. | |
| 2001/0032554 | A1* | 10/2001 | Fritz | B41F 16/00 101/33 |
| 2005/0115421 | A1* | 6/2005 | Lyons | B41J 3/4073 101/42 |
| 2007/0062632 | A1 | 3/2007 | Yarimizu et al. | |
| 2007/0127808 | A1* | 6/2007 | Daniel | B44B 7/007 382/152 |
| 2013/0233067 | A1 | 9/2013 | Wollbrinck et al. | |
| 2014/0063096 | A1* | 3/2014 | Pitz | B41J 11/002 347/9 |
| 2017/0312916 | A1* | 11/2017 | Williams | G01C 21/206 |
| 2018/0229526 | A1* | 8/2018 | Mizuta | B41J 3/4073 |
| 2018/0281202 | A1* | 10/2018 | Brudniok | B25J 15/0042 |
| 2020/0023481 | A1* | 1/2020 | Imboden | B65H 5/10 |
| 2020/0061848 | A1* | 2/2020 | Bolton | B23Q 3/1554 |
| 2021/0300061 | A1* | 9/2021 | Boniface | B41J 25/001 |

FOREIGN PATENT DOCUMENTS

| | | | | | |
|---|---|---|---|---|---|
| JP | 2002122500 | A | * | 4/2002 | B60C 13/001 |
| JP | 2007229878 | A | * | 9/2007 | |
| WO | 2015/086187 | A1 | | 6/2015 | |
| WO | 2017/084830 | A1 | | 5/2017 | |

OTHER PUBLICATIONS

Espacenet translation of Sato, JP 2007229878 A, originally published 2007 (Year: 2007).*

European Patent Office, International Search Report issued in International patent application No. PCT/EP2021/078104 (Jan. 19, 2022).

European Patent Office, Written Opinion issued in International patent application No. PCT/EP2021/078104 (Jan. 19, 2022).

German Patent Office, Search Report issued in German patent application No. 10 2020 213 073.6 (Jun. 10, 2021).

* cited by examiner

METHOD FOR MARKING A VEHICLE TIRE, AND MARKING STATION

RELATED APPLICATIONS

This application claims the benefit under 35 U.S.C. § 371 as a U.S. National Phase Application of application no. PCT/EP2021/078104, filed on 12 Oct. 2021, which claims benefit of German Patent Application no. 10 2020 213 073.6, filed 16 Oct. 2020, the contents of which are hereby incorporated herein by reference in their entireties.

FIELD OF THE DISCLOSURE

The invention relates to a method for marking a vehicle tire and to a marking station for marking a vehicle tire.

BACKGROUND

Tire test stands are known in the prior art by means of which vehicle tires can be subjected to a plurality of different testing processes. In particular imbalances, uniformity, the conicity, and the geometry of the vehicle tire are measured here. The specific values determined are then applied to the tire as markings, for example as colored dots, and identify the vehicle tires according to quality levels. The colored dots can here, depending on requirements, be applied to all the externally visible points of the vehicle tire with the exception of the tire treads.

WO 2015/086187 A1 discloses a method for the automatic marking of a tire, wherein the tire has already left a tire marking machine. The tire to be marked is supplied to the marking station which is arranged directly downstream from the marking machine in a direct path via conveyor belts.

US 2013/233067 A1 discloses a tire test stand with a marking station for automatically changing testing rims. The testing rims are formed here from two axial halves. Each testing rim is suitable for a specific tire size such that it may be necessary to change rims in order to test different tire sizes. The tire test stand from US 2013/233067 A1 can furthermore also comprise a marking station which is not described in detail and a sorting station which is likewise not described in detail.

WO 2011/143175 A2 discloses a system for mounting vehicle wheels. A robot arm of the system takes a rim from a rim store, arranges a valve in the rim, and finally arranges the rim in a tire. The vehicle wheel mounted in such a fashion is then passed by the robot arm to a tire inflation station, where the vehicle wheel is inflated with compressed air. The vehicle wheel is then subjected to a balancing test. Depending on the balancing behavior, the vehicle tire is marked accordingly. A method is furthermore disclosed according to which the vehicle wheel is deposited at different stations for further processing depending on the result of the balancing test.

DE 10 2015 222 865 A1 discloses a method for marking and sorting tires and for changing testing rims for the tires by means of a robot known per se, in which the robot picks up the tested tires and supplies them to a marking apparatus such that a marking which describes the quality of the tire can be applied to the tire by the marking apparatus.

SUMMARY

A problem underlying the invention consists in meeting the existing requirements in tire production and in the vehicle manufacturing industry for the shapes, colors, and number of marking dots of the vehicle tire to be marked with as little technical complexity and as short processing times as possible.

This object is achieved according to the invention by the method for marking a vehicle tire according to claim 1. Advantageous embodiments and developments of the invention can be found in the dependent claims.

The invention relates to a method for marking a vehicle tire, wherein the vehicle tire is supplied to a marking station, wherein the vehicle tire is aligned and centered in the marking station, wherein the marking takes place in the marking station according to properties of the vehicle tire, and wherein the marking takes place by means of a marking device from a plurality of different marking devices. The method according to the invention is characterized in that the marking device for marking the vehicle tire is positioned on the vehicle tire by means of a robot arm.

A method is thus provided which enables a vehicle tire to be marked according to properties of the vehicle tire. The properties of the vehicle tire here preferably describe one of many possible quality levels of the vehicle tire, for example "very good", "good", and "average". Further or other quality levels are also conceivable. The quality levels again represent an imbalance which the respective vehicle tire has in its running behavior. The lesser the imbalance and therefore the better the running behavior of the vehicle tire, advantageously the higher the quality level is too.

Alternatively, the properties of the vehicle tire can preferably also describe noise behavior of the vehicle tire, road adhesion of the vehicle tire, maximum permitted speed of the vehicle tire, or other properties of the vehicle tire which can be applied to the vehicle tire as a marking in addition to or as an alternative to the running behavior of the vehicle tire.

The marking can, for example, be a colored marking or an embossed marking, wherein different quality levels are preferably represented by different colors in the case of colored marking. In the case of embossed marking, different quality levels are preferably represented by different embossed symbols. A combination of colored markings and embossed markings is also possible and preferred. It is also possible and preferred to provide a specific marking material to identify a specific quality level.

The vehicle tire is preferably a so-called PCR (Passenger Car Radial Tire) or a so-called TBR (Truck and Bus Radial Tire).

The vehicle tire is supplied to the marking station advantageously immediately after testing the properties of the vehicle tire, for example via a conveyor belt. The vehicle tire is thus tested in particular before the method according to the invention for marking the vehicle tire in a testing station designed for this purpose.

After the vehicle tire has been supplied to the marking station, for example via a conveyor belt, the vehicle tire is first aligned and centered by the marking station.

The term "centering" is understood here to mean that the axis of rotation of the vehicle tire is brought into a target position and thus the vehicle tire is also in the target position. The vehicle tire then lies in particular centrally on a rotating plate. In the case of a known radial diameter of the vehicle tire, the marking can now be applied at the intended radial position. Centering of the vehicle tire preferably takes place automatically via a centering arm which can shift the tire on the rotating plate.

The term "aligning" is understood here to mean that the vehicle tire is brought into an intended angular position with regard to its axis of rotation. The marking can thus be applied at the intended angular position. The vehicle tire is aligned preferably automatically via the rotating plate.

The actual marking of the vehicle tire then takes place by means of a specific marking device from the plurality of different marking devices, wherein in particular each marking device produces a different marking. It is thus possible to specify which marking is to be applied to the vehicle tire by selecting a specific marking device.

It can advantageously also be provided that each marking device can produce more than just one marking and it can, for example, be possible that a marking device can produce two, three, or more different markings. The two, three, or more different markings of a marking device can preferably be applied independently of one another and according to information from the testing procedure.

According to the invention, it is provided that the marking device for marking the vehicle tire is positioned on the vehicle tire by means of a robot arm. This therefore means that, in contrast to the prior art, it is not the vehicle tire that is held and supplied to the marking device and instead, conversely, the marking device is held and moved toward the vehicle tire. As a result, on the one hand, the required technical complexity can advantageously be reduced because the marking devices which are in each case not held by the robot arm and required for the marking can be put to one side by the robot arm and do not have to be held in readiness in the region of the marking station so that they can be accessed for the vehicle tire. The marking station according to the invention is consequently more compact and also more cost-effective than known marking stations. In addition, this also enables a relatively greater number of marking units to be supplied and hence correspondingly also a greater number of possible different markings, which in turn widens the possible uses of such a marking station compared with known marking stations, in particular with no need for retooling and associated changeover times for the marking station.

It has in addition been shown that the processing times of the marking station according to the invention are reduced compared with the processing times of the known marking stations, i.e. that the method according to the invention for marking a vehicle tire entails a time saving compared with the known methods.

The use of the robot arm moreover offers the advantage that other working steps not relating directly to the vehicle tires, for example changing the testing rims, can also be performed by the robot arm. Changing the testing rims, which in each case consist of an upper and a lower testing rim half, takes place independently of a marking or testing procedure, i.e. whenever a vehicle tire with a different size is to be tested in the testing station. In this case, the robot arm replaces the clamped testing rim halves with other testing rim halves with a different diameter.

A robot arm within the sense of the invention is understood to mean a so-called NC axis system which can take the form of either a commercially available robot known in the prior art or a freely configurable linear axis system. The robot arm is advantageously designed so that it can rotate about a vertical axis of rotation and comprises a plurality of joints which enable at least one rotational movement of arm elements in each case about a horizontal axis of rotation, in particular however also about a vertical axis of rotation. In addition, the robot arm advantageously comprises a tool change system which can take the form of a gripper, in particular a three-finger gripper, by means of which the robot arm can pick up, operate, and deposit again a respective required marking device.

The robot arm preferably has six movement axes. An example of a preferred type of robot is available in the market under the name KR QUANTEC Pro from the manufacturer KUKA.

According to a preferred embodiment of the invention, it is provided that the plurality of different marking devices are stored in a marking device magazine and that the robot arm selects and picks up a specific marking device from the plurality of different marking devices. The marking device magazine can here take the form of, for example, a rack which stores the plurality of different marking devices next to one another and above one another at positions provided for them in each case. The robot arm knows the individual position of each individual marking device and can thus remove them in a targeted fashion from the marking device magazine and also replace them. The marking device magazine enables space-saving storage within the reach of the robot arm whilst at the same time ensuring individual positions in the marking device magazine for each individual marking device.

A plurality of marking device magazines can preferably also be provided which either are all arranged within the reach of the robot arm or can be displaced automatically, for example via a rail system, such that at least always one marking device magazine with a respective required marking device is within the reach of the robot arm.

According to a further preferred embodiment of the invention, it is provided that, when changing the marking device, the robot arm deposits a no longer required marking device in the marking device magazine at a position assigned to the no longer required marking device. This marking device can thus be picked up again later from the position individually allocated to it and known to the robot arm.

According to a further preferred embodiment of the invention, it is provided that the marking device is supplied with electrical and/or thermal energy for a plurality of marking procedures during the time that it is deposited. Depending on the design of the marking device for applying colored markings, embossed markings, or material markings, it may be necessary to supply the marking device with electrical or thermal energy. Thermal energy can be supplied, for example, in such a way that an embossing stamp of a marking device provided for applying embossed markings is heated via an external heat source during the time that it is deposited in the marking device magazine. Such a marking device can furthermore also comprise an electrical energy storage unit by means of which the embossing stamp is heated again after removal from the marking device magazine. It is, however, also conceivable that marking devices provided for applying colored markings or material markings require electrical energy which is provided via the electrical energy storage unit during operation of the respective marking device.

The electrical energy storage unit preferably takes the form of a rechargeable lithium-ion battery.

Electrical energy can be supplied in the marking device magazine, for example, wirelessly by means of induction or via corresponding electrical contacts of the marking device magazine and the respective marking device which come into contact with each other when the marking device is deposited in the marking device magazine.

According to a further preferred embodiment of the invention, it is provided that the aligning and the centering take place at least partly simultaneously. The processing times of the marking station according to the invention can be further reduced as a result.

According to a further preferred embodiment of the invention, it is provided that properties of a plurality of vehicle tires are determined simultaneously in a plurality of testing stations. Because a testing procedure is generally more time-consuming than a marking procedure, the capacity of a marking station carrying out the method according to the invention can be increased when a plurality of testing stations are correspondingly provided which simultaneously determine the properties to be checked in each case of a plurality of vehicle tires in a plurality of testing procedures. This plurality of vehicle tires are then supplied equally to the marking station carrying out the method according to the invention.

According to a further preferred embodiment of the invention, it is provided that information about the properties of the vehicle tire is also supplied as part of the supply. The supply of information here preferably takes place electronically via a data processing program designed for this purpose which first captures the information from the testing process of the vehicle tire and then transmits it to the marking station. The information allows at least a specific marking device to be selected from the plurality of different marking devices, an angular position to be determined, and a radial position to be determined in order to apply the marking.

According to a further preferred embodiment of the invention, it is provided that a tire wall of the vehicle tire is supported on an inner side of the vehicle tire at least during the marking. This simplifies the application of the marking because any give or bending of the tire wall is prevented. The vehicle tire can be supported, for example, by a correspondingly designed support body which is introduced in particular automatically into the inside of the vehicle tire.

The invention furthermore relates to a marking station for marking a vehicle tire, comprising a robot arm and a plurality of different marking devices, wherein the marking devices are stored in at least one marking device magazine and wherein the robot arm is designed to mark the vehicle tires according to properties of the vehicle tire by means of a marking device from the plurality of different marking devices. The marking station according to the invention for marking a vehicle tire is characterized in that the robot arm is furthermore designed to position the marking device for marking the vehicle tire on the vehicle tire. The marking station according to the invention for marking a vehicle tire thus comprises all the required means for carrying out the method according to the invention and hence results in the already described advantages.

According to a preferred embodiment of the invention, it is provided that the plurality of marking devices at least in part take the form of a plurality of heat embossing devices. Heat embossing devices enable the application of embossed markings which are particularly robust and durable.

According to a further preferred embodiment of the invention, it is provided that the plurality of marking devices feature at least in part an electrical energy storage unit. A corresponding marking device can thus take an electrical energy demand required during operation from the energy storage unit and does not need to be supplied with electrical energy via the robot arm during operation. Possible energy demands can be, for example, a heating device for heating a heat embossing stamp, operating a color stamp, operating a microcontroller or other electronic components of the marking device.

According to a further preferred embodiment of the invention, it is provided that the at least one marking device magazine and the plurality of marking devices are designed to charge the respective electrical energy storage unit with electrical energy via a charging procedure whilst the plurality of marking apparatuses are situated in the at least one marking device magazine. The charging with electrical energy preferably takes place via corresponding electrical contacts of the marking device magazine and of the respective marking device which come into contact with each other when the marking device is deposited in the marking device magazine.

According to a particularly preferred embodiment of the invention, it is provided that the charging procedure takes place contactlessly, in particular inductively. It is thus not necessary to provide a specific interface in the form of electrical contacts which match each other.

According to a further preferred embodiment of the invention, it is provided that the plurality of electrical marking devices each feature a thermal energy storage unit. The thermal energy storage unit can take the form, for example, of a metal body which has a relatively high thermal capacity and is in contact with the heat embossing stamp. A temperature of the heat embossing stamp can thus be maintained for a relatively long time in a temperature range required for the heat embossing, which in turn correspondingly extends the period of time for which such a marking device can be used without interruption.

According to a particularly preferred embodiment of the invention, it is provided that the at least one marking device magazine and the plurality of marking devices are designed to charge the respective thermal energy storage unit with thermal energy via a charging procedure whilst the plurality of marking devices are situated in at least one marking device magazine. For this purpose, the at least one marking device magazine can feature, for example, a heat source which comes into contact with the heat embossing stamp when the respective marking device is deposited at its individual position and hence supplies heat to the heat embossing stamp and the thermal energy storage unit which is likewise in contact with the heat embossing stamp.

According to a further preferred embodiment of the invention, it is provided that the marking station is designed to carry out the method according to the invention.

BRIEF DESCRIPTION OF THE DRAWINGS

The invention will be explained below by way of example with the aid of embodiments illustrated in the figures, in which.

The same objects, functional units, and comparable components are designated with the same reference signs in all the figures. These objects, functional units, and comparable components have an identical design with regard to their technical features as long as something different is not explicitly or implicitly apparent from the description.

DETAILED DESCRIPTION

Figure 1:
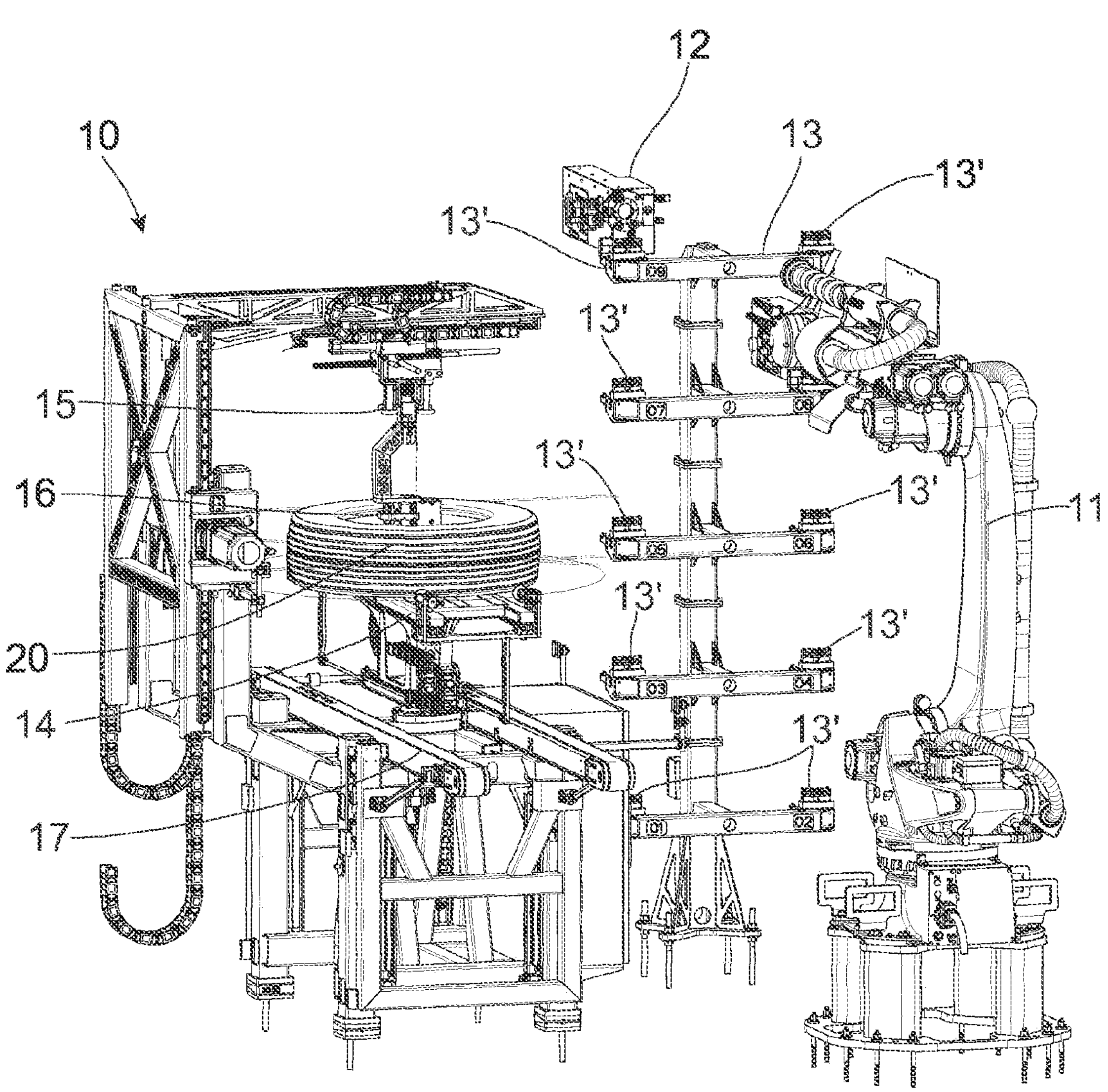
FIG. 1 shows by way of example and schematically a marking station according to the invention for marking a vehicle tire.

FIG. 1 shows by way of example and schematically a marking station 10 according to the invention for marking a vehicle tire 20. The marking station 10 comprises a robot arm 11 and a plurality of different marking devices 12, only one individual marking device 12 of which is illustrated in FIG. 1 for the sake of clarity. As can be seen, the marking device 12 is stored in a marking device magazine 13, wherein the marking device magazine 13 is designed to store a plurality of marking devices 12 at a respective individual position. The marking device magazine 13 additionally features electrical contacts 13' for each marking device 12 which, on the one hand, charge an electrical energy store of the marking devices 12 via correspondingly designed mating contacts (not illustrated in FIG. 1) of the marking devices 12, and moreover heat a heat embossing stamp (likewise not illustrated in FIG. 1) of the marking devices 12 via a heating spindle structurally integrated into the marking devices 12.

The marking station 10 furthermore comprises according to the example a rotating plate 14 for aligning the vehicle tire 20, i.e. for setting an intended angular position with regard to the axis of rotation of the vehicle tire 20. The marking station 20 moreover comprises a centering arm 15 which can shift the vehicle tire 20 on the rotating plate 14 such that the latter lies centrally on the rotating plate 15. After the aligning and centering, which take place simultaneously according to the example, the vehicle tire 20 is situated in the intended position and in the intended angular position.

The robot arm 11 is designed according to the example with six axes of movement. It is furthermore designed to remove a respective required marking device 12 from the marking device magazine 13, to use it to mark the vehicle tire 20, and then to replace it at that position in the marking device magazine 13 from which the marking device 12 was first removed. The marking of the vehicle tire 20 therefore takes place by the robot arm 11 picking up a required marking device 12 from the marking device magazine 13, moving it to the vehicle tire 20, positioning it on the vehicle tire 20, and then marking the vehicle tire 20 by means of the marking device 12. The marking of the vehicle tire 20 here takes place according to properties of the vehicle tire 20 by means of a marking representing the properties and a corresponding marking device 12.

Because the vehicle tire 20 is situated, after the aligning and centering, in a position and angular position intended for applying the marking, the robot arm 12 can move the marking device 12 to the vehicle tire 20 and there apply the marking corresponding to the quality of the vehicle tire 20 at the point of the vehicle tire 20 provided for this purpose.

So that the robot arm 11 picks up the respective required marking device 12 and is used to apply the marking, information about the properties of the vehicle tire 20 is supplied electronically to the marking station 10 via a data processing program designed for this purpose as part of the supplying of the vehicle tire 20. The data processing system here first captures information from the testing procedure of the vehicle tire 20 and then transmits it to the marking station 20. The information then allows a specific marking device 12 to be selected from the plurality of different marking devices 12. After supplying the vehicle tire 20 to the marking station 10, for example via a conveyor belt, the vehicle tire 20 is aligned and centered by the marking station 10.

The marking station 10 furthermore also comprises a support body 16 which is moved automatically during the marking into the inside of the vehicle tire 20 by the robot arm 11 or by the marking device 12 and from there supports the tire wall to which the marking is applied.

Lastly, the marking station 10 also comprises a conveyor belt 17 by means of which the vehicle tire 20 is supplied according to the example to the marking station 10 from one or more testing stations (not illustrated in FIG. 1). The testing stations here first identify the properties of the vehicle tire 20 and the marking station 10 applies to the vehicle tire 20 a marking describing the properties of the vehicle tire 20.

Figure 2:
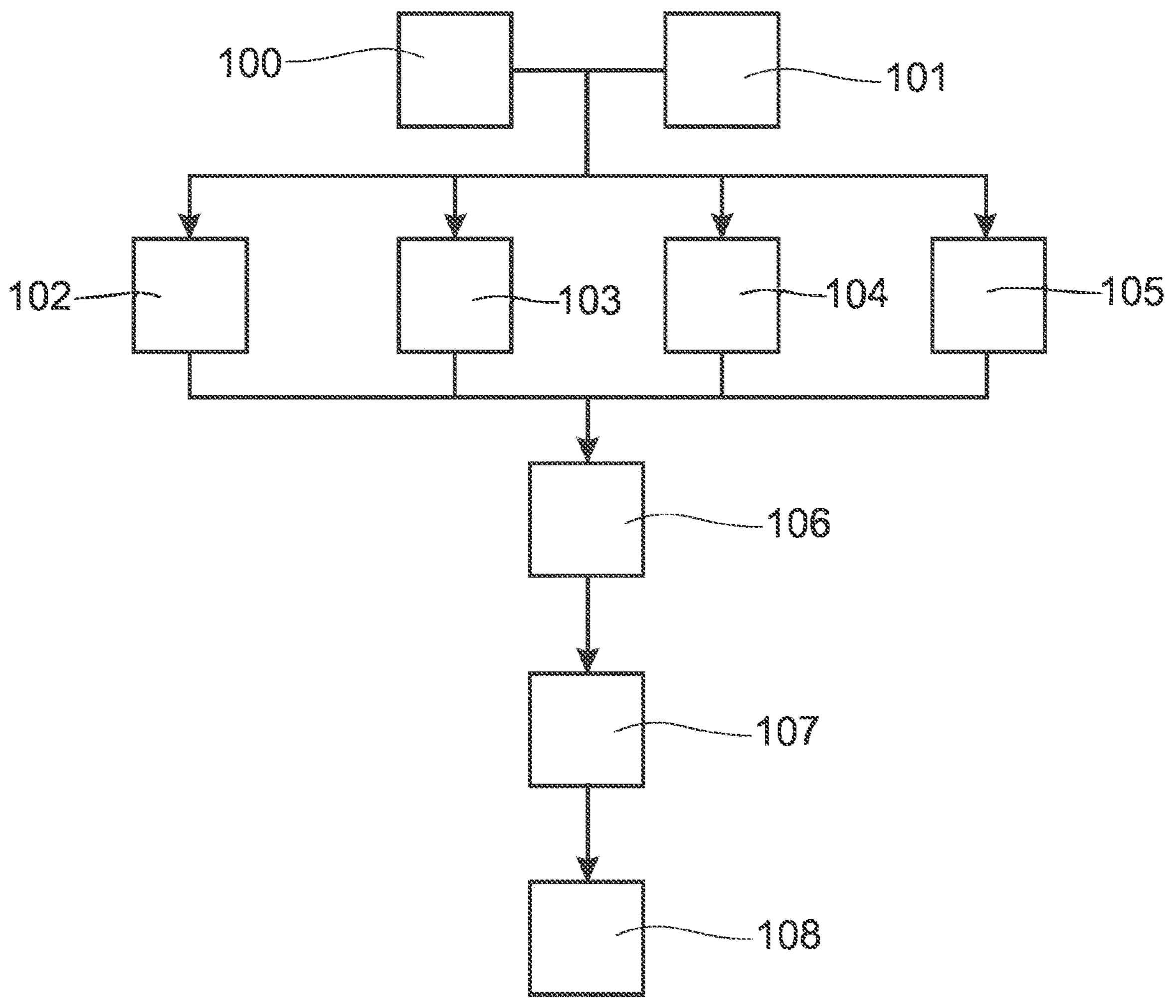
FIG. 2 shows by way of example and schematically a possible embodiment of a method according to the invention for marking a vehicle tire in the form of a flow diagram.

FIG. 2 shows by way of example and schematically a possible embodiment of a method according to the invention for marking a vehicle tire 20 in the form of a flow diagram. In a first method step 100, the vehicle tire 20 is supplied to a marking station 10 according to the invention. At the same time, in step 101, information describing a quality level of the vehicle tire 20 is supplied to the marking station 10. In step 102, the vehicle tire 20 is then aligned and in step 103 the vehicle tire 20 is centered. In step 104, a support body 16 is introduced into the inside of the vehicle tire 20. In step 105, the robot arm 11 selects a marking device 12 from the marking device magazine 13. The steps 102, 103, 104, and 105 take place simultaneously according to the example. In step 106, the robot arm 11 picks up the selected marking device 12, moves it in step 107 to the vehicle tire 20 and positions it on the vehicle tire 20. Lastly, in step 108 the actual marking takes place according to the quality level of the vehicle tire 20.

REFERENCE SIGNS

10 marking station
11 robot arm
12 marking device
13 marking device magazine
13' electrical contacts
14 rotating plate
15 centering arm
16 support body
17 conveyor belt
20 vehicle tire
100 supplying the vehicle tire
101 supplying information describing a quality level of the vehicle tire
102 aligning the vehicle tire
103 centering the vehicle tire
104 introducing a support body
105 selecting a marking device
106 picking up the selected marking device
107 positioning the marking device on the vehicle tire
108 marking the vehicle tire

The invention claimed is:

1. A marking station for marking a vehicle tire, comprising:

at least one marking device magazine, the at least one marking device magazine having a plurality of marking device storage positions;

a plurality of different marking devices, each of the plurality of marking devices is assigned to and supported by a respective one of the plurality of marking device storage positions of the at least one marking device magazine, each of the plurality of marking devices is operable to produce a respective specific mark on the vehicle tire; and a robot arm having a three-fingered gripper and being configured to move and position the three-fingered gripper adjacent a selected marking device from the plurality of different marking devices, and the three-fingered gripper being actuatable to grip the selected marking device and the robot arm being movable to position the selected marking device on the vehicle tire for producing the specific mark on the vehicle tire, the specific marks of the plurality of marking devices each representing a specific respective tire property, wherein each of the plurality of marking devices comprises an electrical or thermal energy storage unit, and each of the plurality of marking device storage positions of the at least one marking device magazine has an electrical or thermal energy supply, such that electrical or thermal energy is transferable to the electrical or thermal energy storage units from the electrical or thermal energy supply when the different marking devices are positioned at the respective marking device storage positions.

2. The marking station of claim 1, wherein each of at least some of the plurality of marking devices includes a respective heat embossing device.

3. The marking station of claim 2, wherein the heat embossing devices of the at least some of the plurality of marking devices are each heated by the respective thermal energy storage unit.

4. The marking station as claimed in claim 1, wherein the at least one marking device magazine is in a form of a rack having a plurality of horizontally aligned support members that are vertically spaced apart from each other, opposite axial ends of each of the horizontally aligned support members has electrical contacts that form the plurality of marking device storage positions such that the plurality of different marking devices are stored in the marking device storage positions next to one another and above one another, and at least some of the plurality of marking devices have electrical contacts which mate with the electrical contacts of the at least one marking device magazine to charge each of the respective electrical energy storage units with electrical energy when the at least some of the plurality of marking devices are situated in the respective marking device storage positions of the at least one marking device magazine.

5. The marking station as claimed in claim 1, wherein the respective electrical energy storage units are electrically charged contactlessly by induction while at least some of the plurality of marking devices are situated in the respective marking device storage positions of the at least one marking device magazine.

6. The marking station of claim 1, wherein each of the plurality of marking devices includes a respective thermal energy storage unit.

7. The marking station of claim 6, wherein the at least one marking device magazine and the plurality of marking devices are configured to charge the respective thermal energy storage unit with thermal energy when the plurality of marking devices are situated in the respective marking device storage positions of the at least one marking device magazine, the at least one marking device magazine comprising a vertically aligned member and a plurality of horizontally aligned arms mounted to and uniformly spaced along the vertically aligned member, wherein opposite ends of each of the plurality of horizontally aligned arms forms a pair of the marking device storage positions.

8. The marking station of claim 1, wherein the marking station further comprises a rotating plate on which the vehicle tire is rotatably supported and a centering arm, the rotating plate is rotatable to align the vehicle tire at an intended angular position about a rotational axis of the vehicle tire, and the centering arm is configured to shift the vehicle tire to a central position on the rotating plate;

the rotating plate and the centering arm align and center the vehicle tire in the marking station; and the selected one of the plurality of marking devices is selected based on identified properties of the vehicle tire, the properties of the vehicle tire being a running behavior quality level, a noise behavior of the vehicle tire, a road adhesion of the vehicle tire and a maximum permitted speed of the vehicle tire.

* * * * *